United States Patent [19]
Jinbo et al.

[11] Patent Number: 5,518,577
[45] Date of Patent: May 21, 1996

[54] APPARATUS FOR MANUFACTURING FIBER-REINFORCED MOLDING COMPOUND

[75] Inventors: Masao Jinbo; Mituo Suzuki, both of Shimizu, Japan

[73] Assignee: Takeda Chemical Industries, Ltd., Osaka, Japan

[21] Appl. No.: 201,418

[22] Filed: Feb. 24, 1994

[30] Foreign Application Priority Data

Feb. 25, 1993 [JP] Japan ..................... 5-036603

[51] Int. Cl.$^6$ .................. B29C 39/20; B29C 70/50
[52] U.S. Cl. .............. 156/549; 156/62.4; 156/276; 156/550; 239/561; 239/565; 264/115; 264/128; 425/82.1; 425/83.1
[58] Field of Search ................. 156/62.2, 62.4, 156/276, 547, 550, 578, 549, 555; 118/313, 315, 316, 325; 239/561, 565, 566, 557; 264/114, 128, 115; 425/80.1, 82.1, 83.1

[56] References Cited

U.S. PATENT DOCUMENTS

| | | | |
|---|---|---|---|
| 2,168,997 | 8/1939 | Lankes et al. | 239/561 |
| 2,771,320 | 11/1956 | Korwin | 239/565 |
| 2,771,387 | 11/1956 | Kleist et al. . | |
| 3,734,814 | 5/1973 | Davis et al. | 156/276 |
| 3,932,980 | 1/1976 | Mizutani et al. | 53/111 |
| 3,957,556 | 5/1976 | Wilson et al. | 156/276 |
| 4,110,151 | 8/1978 | Morse | 156/519 |
| 4,702,872 | 10/1987 | Yamamoto et al. | 264/114 |
| 4,925,095 | 5/1990 | Students | 239/565 |
| 4,950,353 | 8/1990 | Tsujimoto et al. | 156/578 |
| 4,973,440 | 11/1990 | Tamura et al. | 264/114 |
| 4,989,538 | 2/1991 | Tamura et al. | 156/62.2 |

FOREIGN PATENT DOCUMENTS

| | | | |
|---|---|---|---|
| 0322874 | 7/1989 | European Pat. Off. . | |
| 2276153 | 1/1976 | France . | |
| 176728 | 9/1985 | Japan | 156/201 |
| 54405 | 6/1969 | Luxembourg . | |
| 1430231 | 3/1976 | United Kingdom | 118/315 |

*Primary Examiner*—Steven D. Maki
*Attorney, Agent, or Firm*—Wenderoth, Lind & Ponack

[57] ABSTRACT

A paste supply tube in a molding compound manufacturing apparatus includes first and second paste supply tubes extending parallel or substantially parallel to each other and in a direction widthwise of a pair of carrier films, each of the first and second paste supply tubes having upstream and downstream ends opposite to each other with respect to the direction of supply of a resinous paste material thereinto. While the downstream ends of the respective first and second paste supply tubes are closed, the first and second paste supply tubes are supported with the upstream and downstream ends of the first paste supply tube neighboring the downstream and upstream ends of the second paste supply tube, respectively, with respect to a direction perpendicular to the lengthwise direction of each paste supply tube. Each of the first and second paste supply tubes has at least one aperture defined therein for discharge of the resinous paste material therethrough so that the resinous paste material can be uniformly dispensed in a direction widthwise of the carrier film. The aperture may be in the form of either at least one axial row of holes having respective diameters that progressively vary or an axially extending slit having a width that progressively varies.

8 Claims, 7 Drawing Sheets

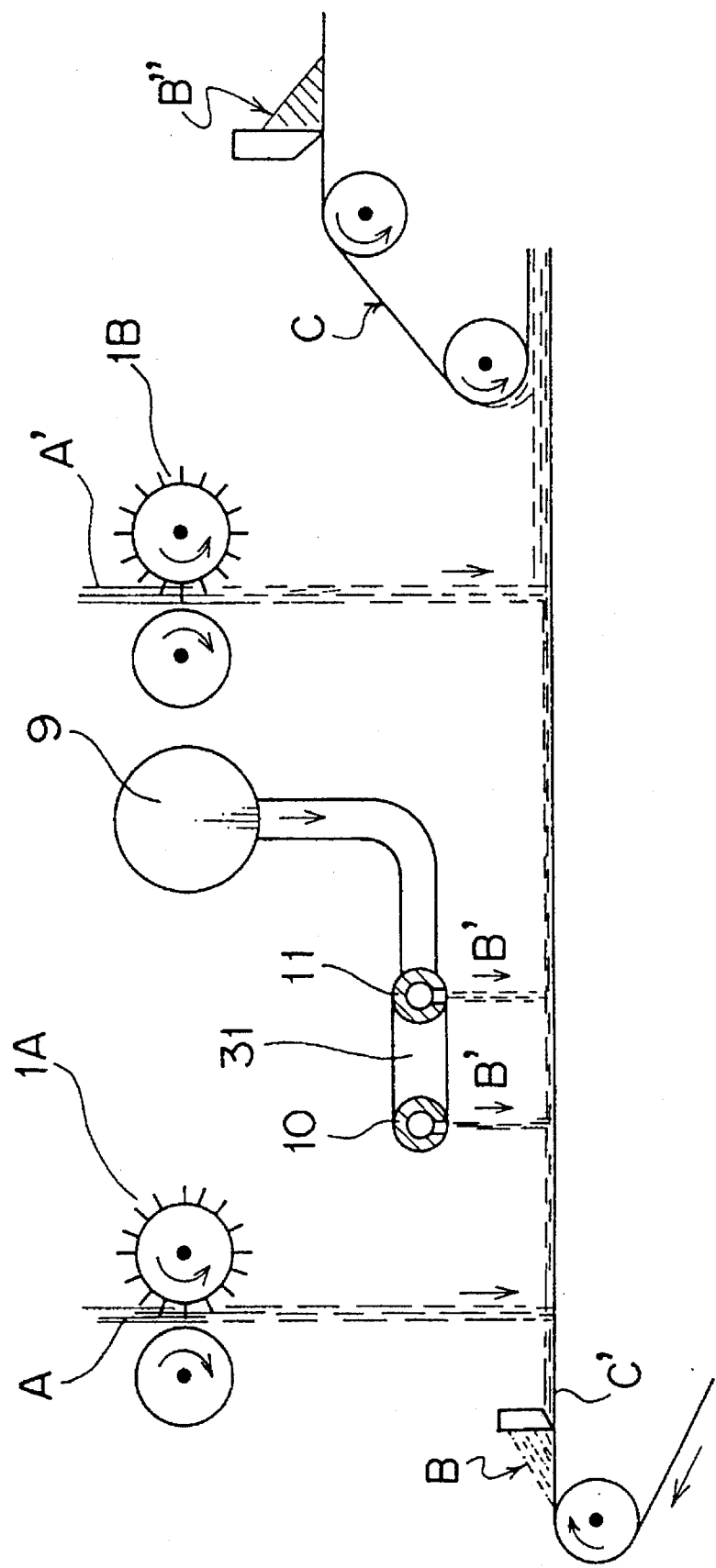

APPARATUS FOR MANUFACTURING FIBER-REINFORCED MOLDING COMPOUND

BACKGROUND OF THE INVENTION

1. Field of the Invention

The present invention generally relates to an apparatus for continuously manufacturing a molding compound such as, for example, TMC (thick molding compound) or SMC (sheet molding compound) by kneading a resinous paste together with reinforcement material such as, for example, glass fibers or Carbon fibers and sandwiching the kneaded mixture between a pair of carrier sheets. In particular, the present invention relates to a resin supply device employed in the molding compound manufacturing apparatus for continuously supplying a resinous paste material, with or without the reinforcement material mixed therein, uniformly in a direction widthwise of each carrier sheet used to sandwich the resinous paste material.

2. Description of the Prior Art

The prior art molding compound manufacturing apparatus of the type referred to above and to which the present invention is applicable is disclosed in, for example, U.S. Pat. No. 3,932,980, issued Jan. 20, 1976, to Mizutani et al. and assigned to the assignee of the present invention, and is reproduced in FIG. 9. Referring to FIG. 9, the molding compound manufacturing apparatus shown therein comprises a chopping unit for breaking a plurality of glass rovings A to form chopped reinforcement glass fibers, a paste supply unit including a batch tank 8 containing a quantity of a resinous paste material B, and a pair of carrier films C and C' each in the form of a sheet or the like.

The chopping unit includes a cutter roll 1 for chopping the glass rovings A into chopped glass fibers of a predetermined length which then fall by gravity into a hopper positioned beneath the chopping unit. Impregnating rolls 3 and 3' are positioned immediately below the hopper for mixing a curtain of the falling glass fibers with the resinous paste material which has been supplied dropwise from perforated supply tubes 2 and 2' onto the peripheral surfaces thereof, respectively. The resinous paste mixed with the glass fibers and adhering to the impregnating rolls 3 and 3' is removed from the impregnating rolls 3 and 3' by scraper rolls 4 and 4' positioned immediately beneath the respective impregnating rolls 3 and 3' and held in contact therewith. The resinous paste removed from the impregnating rolls 3 and 3' and containing the chopped glass fibers subsequently falls by gravity towards an adjoining region, at which the carrier films C and C' adjoin together, and is then sandwiched between the carrier films C and C' as the latter are drawn in one direction while resting on a belt conveyor 5. As the carrier films C and C' with the resinous paste sandwiched therebetween pass through a nipping region between shaping rolls 6 positioned on a downstream side of the adjoining region with respect to the direction of travel of an upper run of the belt conveyor 5, the thick molding compound is produced.

As shown in FIG. 9, each of the paste supply tubes 2 and 2' has an axial length substantially equal to that of the corresponding impregnating roll 3 or 3' and supported is immediately above and parallel to the associated impregnating roll 3 or 3' while spaced a predetermined distance therefrom. Each of these paste supply tubes 2 and 2' has one end 2b and 2b' closed and the opposite end 2a and 2a' fluid-coupled with a constant volume pump 9 through a main supply tube 7 by way of a generally T-shaped coupling, the constant volume pump 9 being in turn fluid-communicated with the batch tank 8 so that the resinous paste material B within the batch tank B can be supplied by the constant volume pump 9 to the paste supply tubes 2 and 2' through the main supply tube 7.

A ribbon-shaped portion of each paste supply tube 2 and 2' which confronts the associated impregnating roll 3 and 3' positioned immediately therebelow is perforated to provide a respective row of perforations 2c and 2c' spaced a predetermined distance from each other in a direction axially thereof. The resinous paste material supplied into the paste supply tubes 2 and 2' in the manner described above can thus be supplied dropwise onto the associated impregnating rolls 3 and 3' through the perforations 2c and 2c'.

The paste supply tubes 2 and 2' employed in the prior art molding compound manufacturing apparatus have been found to have the following problem. The molding compound manufacturing apparatus works satisfactorily for some time subsequent to the start of production of the thick molding compound with the resinous paste material smoothly and uniformly discharged through the perforations 2c and 2c' in the paste supply tubes 2 and 2'. However, since the paste supply tubes 2 and 2' are closed at their free ends 2b and 2b' remote from the main supply tube 7, and as the apparatus continues to be operated, the resinous paste material supplied into the paste supply tubes 2 and 2' and brought to a standstill in the vicinity of the closed ends 2b and 2b' of the respective paste supply tubes 2 and 2' forms puddles of resinous paste material. The puddles of resinous paste material at the closed ends of the paste supply tubes 2 and 2' increase in viscosity with passage of time to thereby form viscid leftovers. These viscid leftovers of resinous paste material once formed downstream of the respective paste supply tubes 2 and 2' with respect to the direction of flow of the resinous paste material expand in a direction upstream of the respective paste supply tubes 2 and 2' with the further passage of time unless removed by cleaning, thereby causing clogging of some of the perforations 2c and 2c' adjacent the closed ends 2b and 2b'.

Once this occurs, the cascade flow of resinous paste material discharged from respective rows of perforations in each paste supply tube 2 and 2' becomes narrower. That is, the discharge of the resinous paste material from the perforations 2c and 2c' in the respective paste supply tubes 2 and 2' becomes such that it is supplied onto the impregnating rolls 3 and 3' in a quantity smaller at the downstream side than that at the upstream side with respect to the direction of flow of the resinous paste material within the paste supply tubes 2 and 2'. Consequently, uniform distribution of the resinous paste material over the substantially entire length of each impregnating roll 3 and 3' is no longer obtained. Uneven distribution of the resinous paste material over the impregnating rolls 3 and 3' resulting from the presence of the biased viscid leftovers within the paste supply tubes 2 and 2' eventually results in a production of the tick molding compound having a thickness varying in a direction across the width W thereof.

The molding compound manufacturing apparatus may be utilized to form a multi-layered sheet of molding compound such as SMC and the foregoing problems can be equally found in this type of multi-layered sheet manufacturing apparatus.

As discussed hereinabove, failure of the paste supply tubes to dispense the resinous paste material uniformly over the substantially entire length of the impregnating rolls results in the formation of the thick molding compound having a thickness varying in a widthwise direction thereof. Therefore, it has been a routine practice to bring the apparatus to a halt and then to clean the paste supply tubes by the use of a suitable solvent such as, for example, ethyl acetate. This cleaning of the paste supply tubes is carried out generally at regular intervals of 2 to 3 hours subsequent to the start of production of the thick molding compound and, for this reason, the efficiency of production tends to be lowered.

The cascade flow of resinous paste material when reduced in width for the reason discussed above results in the production of the thick molding compound having a width, only part of which can be used as a material for a molded product.

Also, the thick molding compound having the thickness varying widthwise poses a problem when it is wound around a take-up reel or hub for storage. Specifically, as the thick molding compound is wound around the take-up reel to thereby form a roll of thick molding compound, the resultant roll of thick molding compound has an increased outer diameter at one end as compared with the outer diameter at the opposite end thereof and the winding of the thick molding compound will soon become unstable.

SUMMARY OF THE INVENTION

Accordingly, the present invention has been devised with a view to substantially eliminating the above discussed problems inherent in the prior art molding compound manufacturing apparatus and is intended to provide an improved molding compound manufacturing apparatus employing a paste supply tube assembly improved to make it possible to supply the resinous paste material uniformly over the entire length of each paste supply tube so that the resultant thick or sheet molding compound can be manufactured with high production efficiency, having uniform thickness across the width thereof.

More specifically, since the formation of the puddle of resinous paste material within and at the downstream end of each paste supply tube cannot be completely avoided so long as each paste supply tube is of a type having the downstream end closed, the present invention provides a thick molding compound manufacturing apparatus which comprises first and second paste supply tubes extending parallel or substantially parallel to each other and in a direction widthwise of a pair of carrier films, each of the first and second paste supply tubes having upstream and downstream ends opposite to each other with respect to the direction of supply of a resinous paste material thereinto. While the downstream ends of the respective first and second paste supply tubes are closed, the first and second paste supply tubes are supported with the upstream and downstream ends of the first paste supply tube neighboring the downstream and upstream ends of the second paste supply tube, respectively, with respect to a direction perpendicular to the lengthwise direction of each paste supply tube. Each of the first and second paste supply tubes has an aperture means defined therein for discharge of the resinous paste material therethrough so that the resinous paste material can be uniformly dispensed in a direction widthwise of the carrier film.

Preferably, the aperture means defined in each of the first and second paste supply tubes has an effective opening so chosen and so designed in consideration of a possible loss of pressure within the respective paste supply tube as to progressively increase from the upstream end towards the downstream end of each paste supply tube. The term "effective opening" of the aperture means in each paste supply tube referred to above and used hereinafter is to be understood as meaning the opening of one perforation such as the slit referred to above or all of the perforations such as the holes referred to above, through which the resinous paste material supplied into the respective paste supply tube emerges outwardly.

Accordingly, in a preferred embodiment of the present invention, the opening means in each paste supply tube may be in the form of at least one row of regularly spaced holes extending axially of the respective paste supply tube, the holes having a size progressively increasing from the upstream end towards the downstream end. Alternatively, the opening means in each paste supply tube may be in the form of two circumferentially spaced rows of regularly spaced holes extending axially of the respective paste supply tube in substantially parallel relation to each other. Each of the holes of each row may be of an equal size or diameter, but depending on the kind of the resinous paste material, it may have a size progressively increasing from the upstream end towards the downstream end.

Again alternatively, the aperture means may be in the form of a slit extending axially of the respective paste supply tube. The slit in each paste supply tube may have an equal width over the length of the respective paste supply tube, but depending on the kind of the resinous paste material, the width of the slit may progressively increase from the upstream end towards the downstream end. The use of the slit of a width progressively increasing from the upstream end towards the downstream end in each paste supply tube is particularly advantageous where the resinous paste material is mixed with fibrous reinforcement material.

The first and second paste supply tubes referred to above are supported immediately above and parallel or substantially parallel to first and second impregnating rolls that are used to impregnate the resinous paste material with glass fibers. Alternatively, the first and second paste supply tubes may be supported above the carrier films so as to extend widthwise of the carrier films so that the resinous paste material discharged from the first and second paste supply tubes can be supplied onto one of the carrier films. In either case, the first and second paste supply tubes have to be supported with their aperture means oriented towards the associated impregnating rolls or towards one of the carrier films.

Preferably, the upstream ends of the first and second paste supply tubes, which are diagonally opposed to each other, are fluid-coupled with respective connecting tubes which are in turn fluid-coupled with a main supply tube through a generally T-shaped coupling member.

According to the present invention, the resinous paste material may be of any suitable composition such as, for example, resin component, vinyl monomer, polymerization initiator, thermoplastic resin, polymerization inhibitor, thickening agent and so on. The resin component referred to above may include thermosetting resins such as, for example, unsaturated polyester resin, vinyl ester resin or epoxy resin. Although the resin components may be employed singly or in combination of two or more of them, the use of unsaturated polyester resin or vinyl ester resin is preferred.

The vinyl monomer which can be employed in the present invention is preferably one customarily used as a crosslinking agent or a diluent agent for the resin component referred to above. Examples of this vinyl monomer include aromatic vinyl monomers such as, for example, styrene, and acrylic vinyl monomers such as, for example, methyl methacrylate.

The polymerization initiator which can be employed in the present invention may include peroxyesters such as, for example, t-butylperoxy benzoate, and peroxycarbonates such as, for example, t-butyl peroxyisopropyl carbonate.

The thermoplastic resin which can be employed in the present invention may be of a kind generally utilized as a low shrinking agent for the production of thermosetting resins and may includes polystyrene, polyvinyl acetate, polybutadiene or its hydrogen additives, and polyisoprene or its hydrogen additive. The thickening agent which can be employed in the present invention may include oxides or hydroxides of alkaline earth metal such as, for example, magnesium.

The reinforcement fibers referred to above and which can be employed in the present invention include inorganic fibers such as, for example, glass fibers or carbon fibers, or organic fibers such as, for example, aramid fibers or high-strength polyethylene fibers.

According to the present invention, the thick molding compound manufacturing apparatus for the production of TMC is provided with first and second paste supply tubes supported immediately above the respective impregnating rolls so as to extend parallel or substantially parallel to each other and also to the impregnating rolls, each of the first and second paste supply tubes having upstream and downstream ends opposite to each other with respect to the direction of supply of a resinous paste material thereinto. The downstream ends of the respective first and second paste supply tubes are closed, and the first and second paste supply tubes are supported with the upstream and downstream ends of the first paste supply tube neighboring the downstream and upstream ends of the second paste supply tube, respectively. Each of the first and second paste supply tubes has an aperture means defined therein for discharge of the resinous paste material therethrough so that the resinous paste material can be uniformly dispensed in a direction widthwise of the carrier film onto the associated impregnating rolls.

Also, according to the present invention, the sheet molding compound manufacturing apparatus for the production of SMC is provided with first and second paste supply tubes supported above a lower one of the carrier films so as to extend parallel to each other and in a direction widthwise of the carrier film, each of the first and second paste supply tubes having upstream and downstream ends opposite to each other with respect to the direction of supply of a resinous paste material thereinto. The downstream ends of the respective first and second paste supply tubes are closed, and the first and second paste supply tubes are supported with the upstream and downstream ends of the first paste supply tube neighboring the downstream and upstream ends of the second paste supply tube, respectively. Each of the first and second paste supply tubes has an aperture means defined therein for discharge of the resinous paste material therethrough so that the resinous paste material can be uniformly dispensed in a direction widthwise of the carrier film onto the lower carrier film.

Thus, one feature of the present invention resides in that the first and second paste supply tubes are supported above the impregnating roll or the carrier film with the upstream and downstream ends of the first paste supply tube neighboring the downstream and upstream ends of the second paste supply tube, respectively. With this feature, even though the resinous paste material piles up within and at the closed downstream end of, for example, the first paste supply tube and the viscosity thereof gradually increases to such an extent as to substantially close or completely close part of the aperture means in a generally downstream region of the first paste supply tube, reduction in quantity of the resinous paste material discharged from the downstream region of the first paste supply tube can be advantageously compensated for by the quantity of the resinous paste material discharged from part of the aperture means in a generally upstream region of the second paste supply tube. This is possible partly because, as described above, the upstream and downstream ends of the first paste supply tube are so positioned as to neighbor with the downstream and upstream ends of the second paste supply tube, respectively, and partly because the effective opening of the aperture means in each of the first and second paste supply tubes progressively increases from the upstream end towards the downstream end of each paste supply tube.

The foregoing description equally applies even where the resinous paste material piles up within and at the downstream end of the second paste supply tube.

An additional feature of the present invention resides in that, to meet with the possible loss of pressure which would eventually occur in each of the first and second paste supply tubes when the resinous paste material piles up within and at the closed downstream end thereof, the effective opening of the aperture means in each of the first and second paste supply tubes preferably increases progressively in a direction downstream of each paste supply tube with respect to the direction of supply of the resinous paste material into the respective paste supply tube, although it may have a uniform size, i.e., diameter or width. Because of this feature, the flow of the resinous paste material supplied into each paste supply tube can be distributed uniformly over substantially the entire length of such paste supply tube.

These features of the present invention altogether bring about a substantially uniform supply of the resinous paste material in the sense that the resultant thick or sheet molding compound can have a substantially uniform thickness in a direction widthwise thereof. In addition, the apparatus embodying the present invention can work satisfactorily with any resinous paste material of a kind of which viscosity tends to increase with time.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 8 is a schematic diagram showing how the sheet molding compound manufacturing apparatus shown in FIG. 6 works to produce the multi-layered molding compound.

DETAILED DESCRIPTION OF THE EMBODIMENTS

Figure 1:
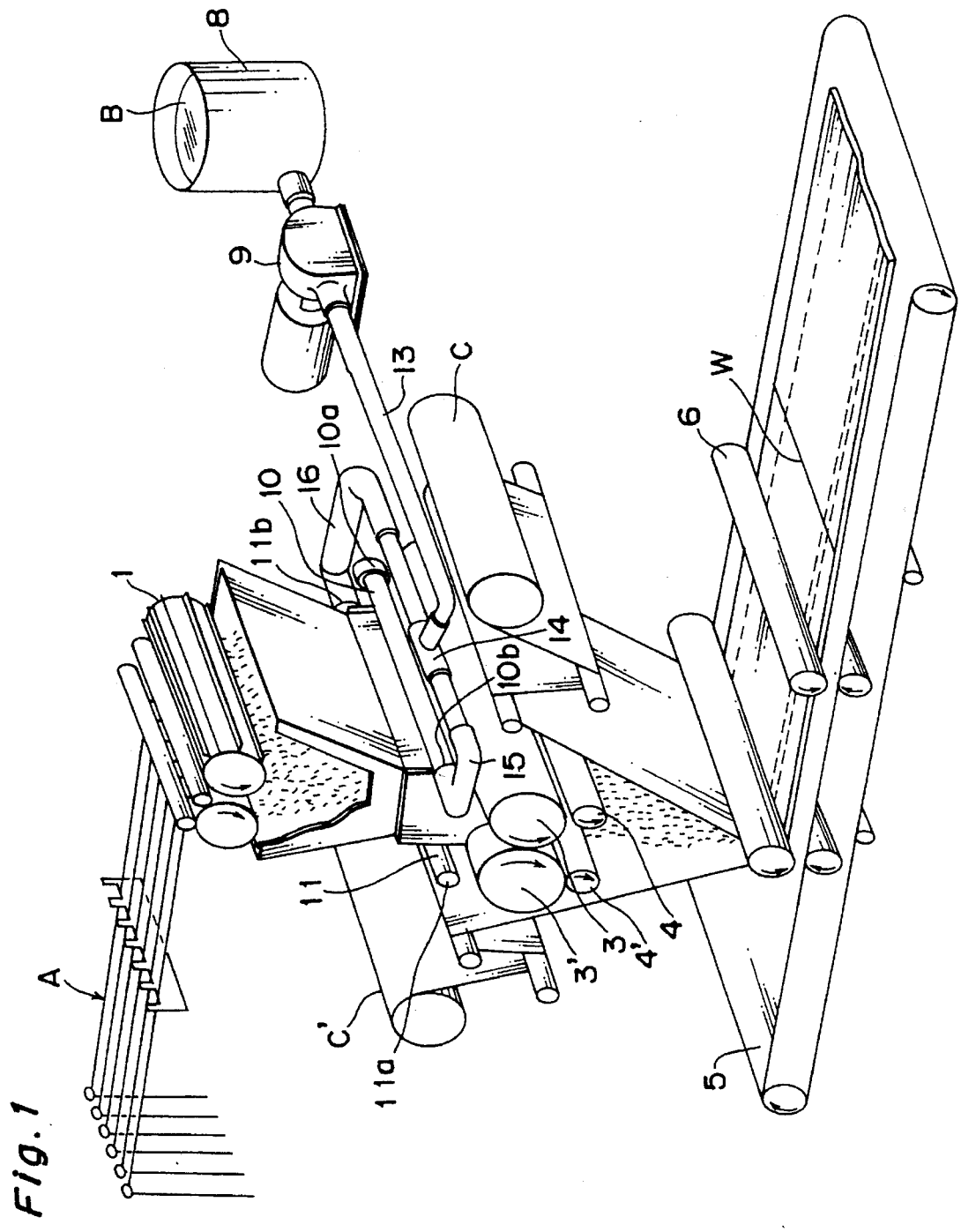
FIG. 1 is a schematic perspective view of a thick molding compound manufacturing apparatus provided with a paste supply tube assembly according to a first preferred embodiment of the present invention.

Referring first to FIGS. 1 to 4 showing a first preferred embodiment of the present invention as applied to a TMC manufacturing apparatus, reference character A represents a plurality of glass rovings, reference character B represents a paste material comprising a resinous component, and reference characters C and C' represent upper and lower carrier films each in the form of, for example, a polyethylene sheet.

The TMC manufacturing apparatus shown therein comprises a chopping unit for breaking the glass rovings A to form chopped reinforcement glass fibers, and a paste supply unit including a batch tank 8 containing a quantity of the resinous paste material B.

The chopping unit includes a rotatably supported cutter roll 1 for chopping the glass rovings A into chopped glass fibers of a predetermined length which then fall by gravity into a hopper positioned therebelow. Positioned immediately below the hopper are impregnating rolls 3 and 3' for mixing the downwardly falling glass fibers with the resinous paste material which has been supplied dropwise from first and second paste supply tubes 10 and 11 onto the peripheral surfaces thereof, respectively, as will be described in detail later. The resinous paste mixed with the glass fibers and adhering to the impregnating rolls 3 and 3' is removed from the impregnating rolls 3 and 3' by scraper rolls 4 and 4' positioned immediately beneath the respective impregnating rolls 3 and 3' and held in contact therewith. The resinous paste removed off from the impregnating rolls 3 and 3' and containing the chopped glass fibers subsequently falls by gravity towards an adjoining region, at which the carrier films C and C' adjoin together, and is then sandwiched between the carrier films C and C' as the latter are drawn in one direction (i.e. coverage) while resting on a belt conveyor 5. As the carrier films C and C' with the resinous paste sandwiched therebetween pass through a nipping region between shaping rolls 6 positioned on a downstream side of the adjoining region with respect to the direction of travel of an upper run of the belt conveyor 5, the TMC sheet is produced.

The first and second paste supply tubes 10 and 11 are supported above the adjacent impregnating rolls 3 and 3' with their longitudinal axes oriented in a direction of the width W of the carrier films and spaced a predetermined distance from each other in a direction perpendicular to the widthwise direction W so that the resinous paste material B supplied from the batch tank 8 by way of the constant volume pump 9 can be dispensed onto the impregnating rolls 3 and 3' over the length thereof.

Except for the specific details of the first and second paste supply tubes 10 and 11, the apparatus so far described may be of a known construction such as disclosed in the previously mentioned U.S. Pat. No. 3,932,980 which is incorporated herein by reference.

Figure 2:
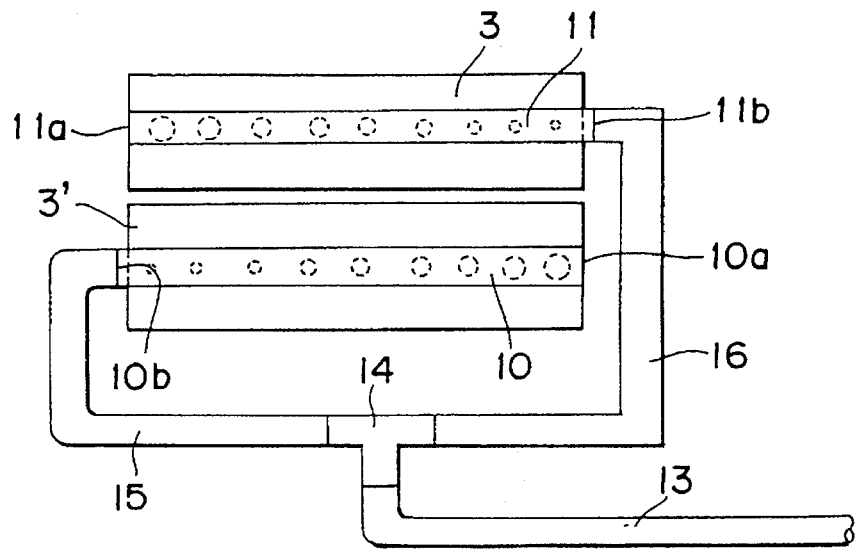
FIG. 2 is a schematic top plan view showing the paste supply tube assembly shown in FIG. 1.
Figure 4:
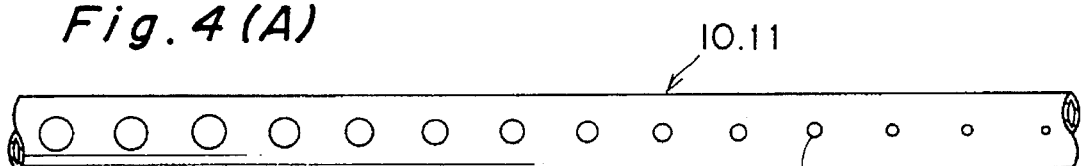
FIGS. 4(A), 4(B) and 4(C) are fragmentary bottom plan views showing different patterns of perforations defined in each of two paste supply tubes forming the paste supply tube assembly.
Figure 4:
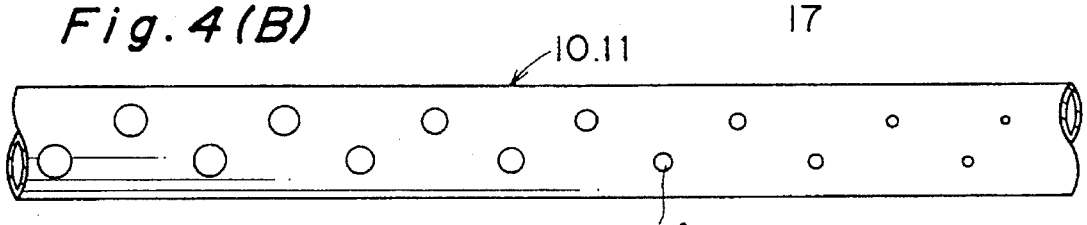
Figure 4:
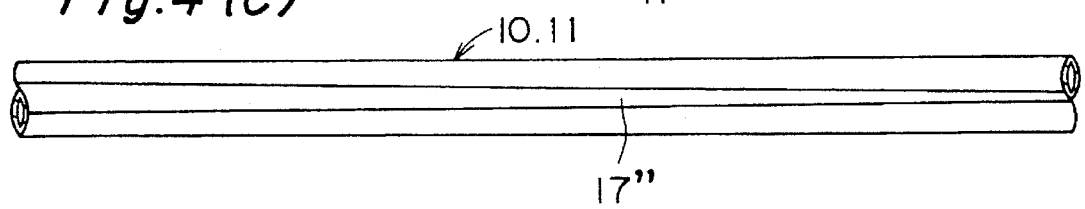
Figure 3:
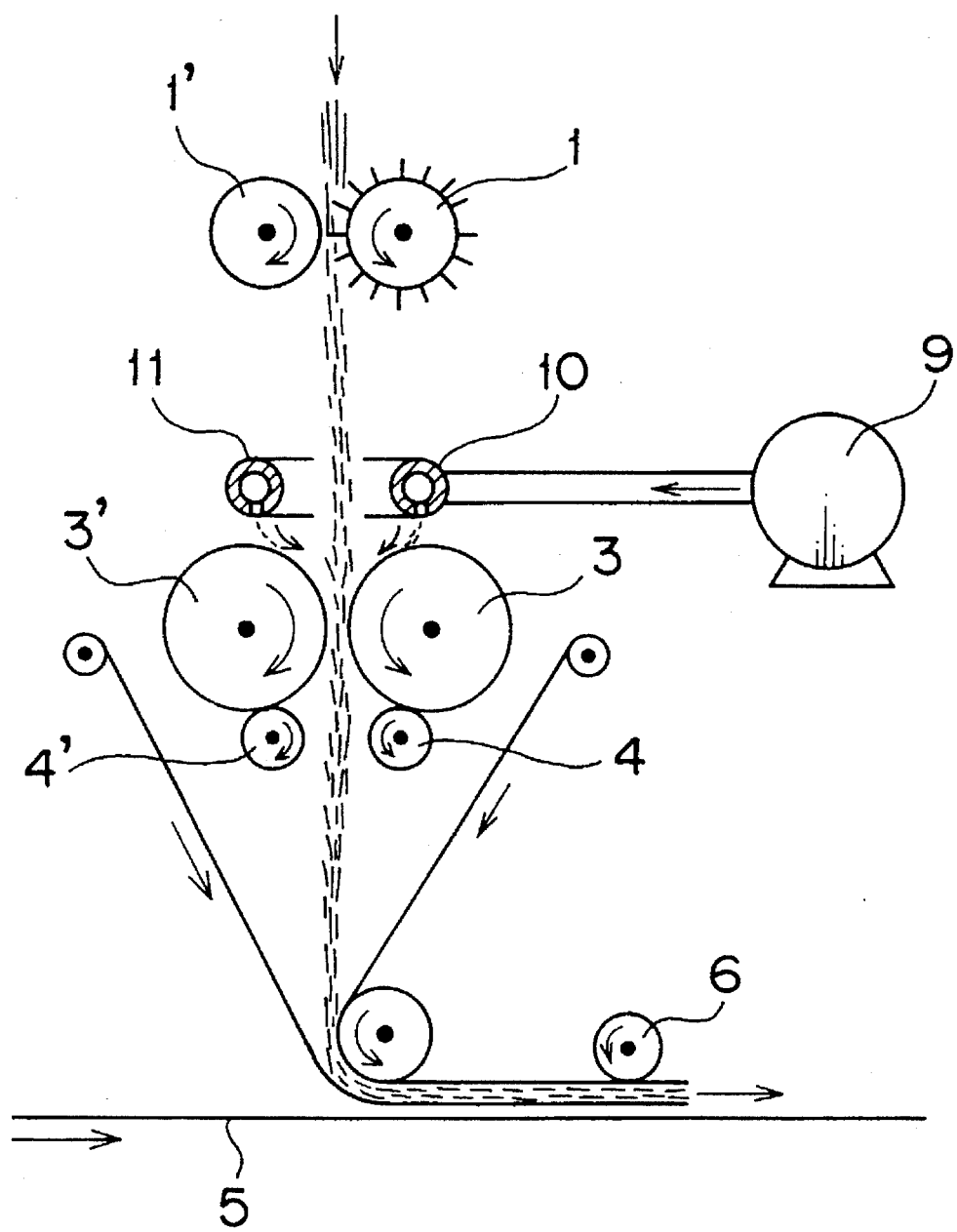
FIG. 3 is a schematic side elevational view of the thick molding compound manufacturing apparatus, showing how a thick molding compound is manufactured.

As best shown in FIGS. 1 and 2, each of the first and second paste supply tubes 10 and 11 is in the form of a tube of round cross-section, having downstream and upstream ends 10a and 11a, 10b and 11b opposite to each other, the terms "upstream" and "downstream" being used with respect to the direction of supply of the resinous paste material through the first and second paste supply tubes 10 and 11. As is the case with those employed in the prior art apparatus, the respective downstream ends 10a and 11a of the first and second paste supply tubes 10 and 11 are closed in any suitable manner, for example, by the use of removable or permanent end closures or plugs.

As the nomenclature makes it clear, the respective upstream ends 10b and 11b are fluid-coupled through generally U-shaped, respective connecting tubes 15 and 16 to a generally T-shaped coupling tube 14 which is in turn fluid-coupled with the constant volume pump 9 through a main supply tube 13. As best shown in FIGS. 1 and 2, the first and second paste supply tubes 10 and 11 are rigid tubes and are supported with the downstream and upstream ends 10a and 10b of the first paste supply tube 10 neighboring the upstream and downstream ends 11b and 11a of the second paste supply tube 11, respectively, in a direction perpendicular to the lengthwise direction of each paste supply tube 10 and 11.

More specifically, in this arrangement, the downstream ends 10a and 11a of the first and second paste supply tubes 10 and 11 are held in position diagonally opposite to each other while the upstream ends 10b and 11b of the first and second paste supply tubes 10 and 11 are held in position diagonally opposed to each other such that the resinous paste material supplied into the first paste supply tube 10 flows towards the closed downstream end 10a in a direction counter to the direction of flow of the resinous paste material supplied into the second paste supply tube 11 so as to flow towards the closed downstream end 11a.

As best shown in FIGS. 2 and 4(A), a ribbon-shaped portion of each paste supply tube 10 and 11 which confronts the associated impregnating roll 3 or 3' positioned immediately therebelow is perforated to provide an axial row of holes 17 spaced a predetermined distance from each other for the discharge of the resinous paste material onto the associated impregnating roll 3 or 3'. Although the holes 17 in each paste supply tube 10 and 11 may have an equal diameter, the holes 17 in the illustrated embodiment have respective diameters progressively increasing from the upstream end 10b or 11b towards the downstream end 10a or 11a so that the resinous paste material can be uniformly discharged over the length of the respective paste supply tube 10 or 11 because of a high pressure prevailing at an upstream side of the paste supply tube and a low pressure prevailing at a downstream side of the same paste supply tube.

In each of the first and second paste supply tubes 10 and 11 may have a length of 1,000 mm with the holes 17 spaced at a pitch of 3.5 mm, the largest and smallest holes 17 at the downstream and upstream side having respective diameters of 2.8 mm and 1.9 mm.

Instead of the single axial row of the holes 17 as best shown in FIG. 4(A), a plurality of, for example, two, axially extending parallel rows of holes 17' may be employed as shown in FIG. 4(B). Preferably, the holes 17' in one axial row are alternately staggered with the holes 17' in the adjacent axial row with respect to the lengthwise direction of each paste supply tube 10 and 11 as clearly shown in FIG. 4(B). Where the plural rows of the holes 17' are employed, each of the holes 17' in each row may be of an equal size or diameter, but depending on the kind of the resinous paste material, it may have a size progressively increasing from the upstream end towards the downstream end for a reason similar to that described in connection with the holes 17 of FIG. 4(A).

Also, each of the first and second paste supply tubes 10 and 11 may, instead of the use of the holes 17 or 17', have a slit 17" extending axially of the respective paste supply tube 10 or 11. The slit in each paste supply tube 10 and 11 may have an equal width over the length of the respective paste supply tube, but depending on the kind of the resinous paste material, the width of the slit may progressively increase from the upstream end towards the downstream end for a reason similar to that discussed in connection with the holes 17 of FIG. 4(A). The use of the slit 17" of a width progressively increasing from the upstream end 10b or 11b towards the downstream end 10a or 11a in each paste supply tube 10 and 11 is particularly advantageous where the resinous paste material is mixed with fibrous reinforcement material.

Figure 5:
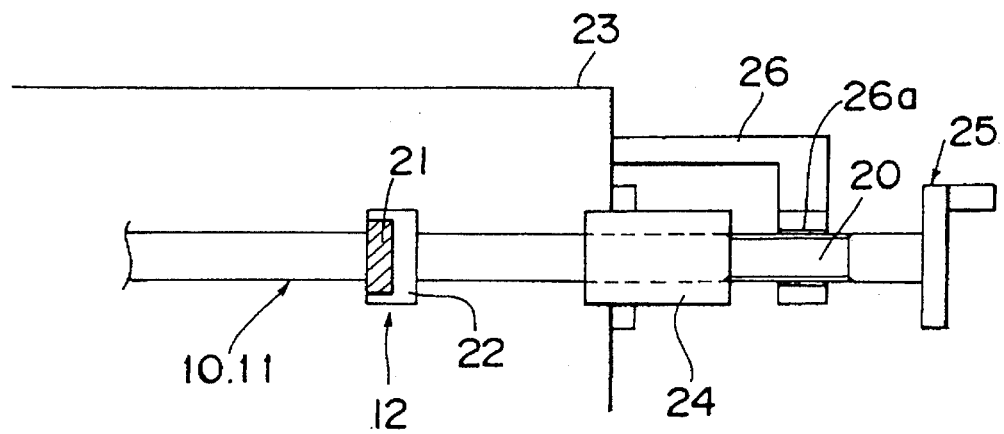
FIG. 5 is a schematic elevational view showing, on an enlarged scale, a closed downstream end of each paste supply tube employed in the apparatus of FIG. 1.

As indicated previously, the downstream end 10a or 11a of each paste supply tube 10 and 11 is closed. In the illustrated embodiment of the present invention, closure of the downstream end 10a or 11a is accomplished by the use of a removable plug 12 carried by a screw rod 20 as shown in FIG. 5. Referring to FIG. 5, the removable plug 12 includes a rubber disc 21 fixedly received in a cup 22 integral or rigid with the screw rod 20 that is operatively supported by a framework 23 by means of a holder sleeve 24. An end portion of the screw rod 20 opposite to the cup 22 with respect to the holder sleeve 24 threadingly extends through an internally threaded nut 26a carried or formed in a support arm 26 protruding laterally outwardly from the framework 23 with an adjustment handle 25 secured to a free end of the screw rod 20. It will readily be seen that, when the handle 25 is turned in one of opposite directions, the rubber disc 21 is brought into fluid-tight engagement with the downstream end 10a or 11a of each paste supply tube 10 and 11 as shown in FIG. 5, but when the handle 25 is turned in the opposite direction, the rubber disc 21 disengages from the downstream end 10a or 11a of the respective paste tube 10 and 11, allowing the respective paste supply tube 10 and 11 to be removed from the apparatus for cleaning or any other purpose.

The TMC manufacturing apparatus embodying the present invention operates in a manner substantially similar to the prior art apparatus such as disclosed in the aforementioned U.S. Pat. No. 3,932,980. However, with the passage of time subsequent to the start of operation of the apparatus, a viscous puddle of resinous paste material becomes deposited within and at the downstream end 10a or 11a of each paste supply tube 10 and 11, thereby causing a reduction in discharge of the resinous paste material from the aperture(s) at in the downstream region of the respective paste supply tube.

Even though viscous puddles of resinous paste material are so deposited within and at the downstream ends 10a and 11a of the respective paste supply tubes 10 and 11, accompanied by the reduction in discharge of the resinous paste material from the aperture(s) in the downstream region thereof, the resultant TMC sheet can have a uniform thickness across the width W thereof partly because the downstream and upstream ends 10a and 10b of the first paste supply tube 10 are so positioned as to confront the upstream and downstream ends 11b and 11a of the second paste supply tube 11, respectively, in a direction perpendicular to the lengthwise direction of each paste supply tube 10 and 11 and partly because the discharge of the resinous paste material from the aperture(s) in the upstream region of the paste supply tubes 10 and 11 remains substantially unchanged, thereby compensating for reduction in discharge of the resinous paste material from the aperture(s) in the downstream region.

Therefore, according to the present invention, considering a cascade flow of the resinous paste material approaching the adjoining region between the carrier films C and C' at which the resinous paste material is ready to be sandwiched between these carrier films C and C', the cascade flow can have a generally uniform thickness across the widthwise direction sufficient to permit the eventually formed TMC sheet to have a substantially uniform thickness across the width W thereof. As the carrier films C and C' with the resinous paste sandwiched therebetween then passes through a nipping region between the shaping rolls 6 positioned on a downstream side of the adjoining region with respect to the direction of travel of an upper run of the belt conveyor 5, the TMC sheet is produced.

The first embodiment of the present invention will now be demonstrated by way of an example which is to be understood as being presented only for the purpose of illustration, not for limiting the scope of the present invention.

EXPERIMENTAL EXAMPLE I

Figure 9:
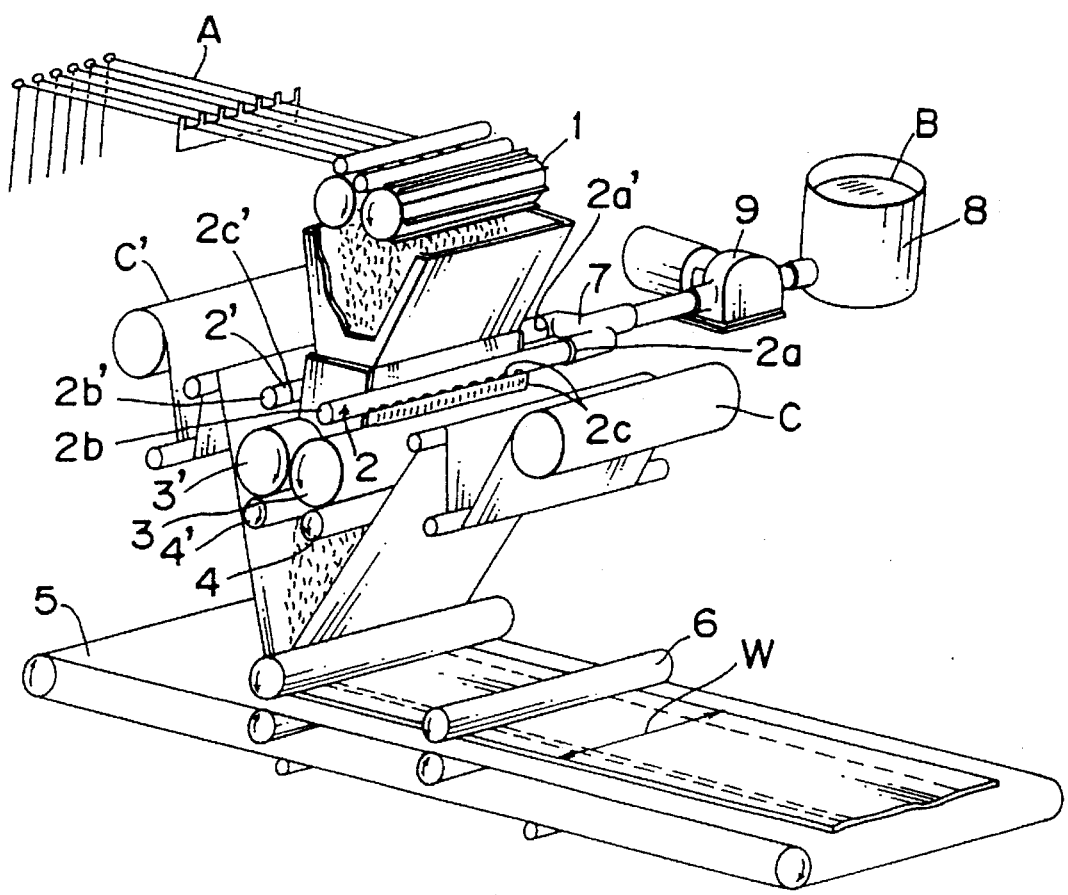
FIG. 9 is a schematic perspective view of the prior art thick molding compound manufacturing apparatus.

With respect to the paste supply tube assembly of the structure shown particularly in FIGS. 1 and 2 and the prior art paste supply tube assembly of the structure shown in FIG. 9, comparative experiments have been carried out to determine the width of the resultant TMC and the shape of a roll of the resultant TMC wound around a take-up roll. During the comparative experiments, for the resinous paste material, the following composition was employed.

100 Parts of unsaturated polyester resin (Polymal 6409 manufactured by Takeda Chemical Industries, Ltd.)

3 parts of polyethylene powder (FLOTHENE UF 20 manufactured by Sumitomo Seika Kabushiki Kaisha)

1 part of tertiary-butyl peroxy benzoate (PERBUTYL Z manufactured by Nippon Yushi Kabushiki Kaisha)

0.05 part of hydroquinone (HQ manufactured by Fuji Shashin Film Kabushiki Kaisha)

4 parts of zinc stearate (SZ-2000 manufactured by Sakai Kagaku Kabushiki Kaisha)

120 parts of calcium carbonate (SUPER SS manufactured by Maruo Calcium Kabushiki Kaisha)

5 parts of Ivory-colored toner (Product of Daitai Kakou Kabushiki Kaisha)

1 part of magnesium oxide (KYOWAMAG 40 manufactured by Kyowa Kagaku Kabushiki Kaisha)

70 wt % of the resinous paste material of the above described composition was blended with 30 wt % of glass fibers which were obtained by cutting glass rovings (TEX 4630 manufactured by Nippon Denki Garasu Kabushiki Kaisha) to 1 inch by the use of a glass roving cutter, to eventually provide TMC.

Results of the experiments are tabulated in Table 1.

TABLE 1

| Time Passed after Impreg- nation Starts | Embodiment | | Prior Art | |
| --- | --- | --- | --- | --- |
| | Width W | Roll Shape | Width W | Roll Shape |
| Shortly | 1,000 mm | normal | 1,000 mm | normal |
| 1 hour | 1,000 mm | normal | 990 mm | somewhat conical |
| 2 hours | 1,000 mm | normal | 985 mm | unable to roll** |
| 8 hours | 995 mm | normal | * | unable to roll** |

*indicates that the cleaning of the paste supply tubes came to be required.
**indicates that the roll of the resultant SMC was too conical to take up around the take-up roll.

As shown in Table 1, the use of the paste supply tube assembly according to the present invention has resulted in a distribution of substantially uniform thickness over the widthwise direction of the thick molding compound, for an 8 hour period subsequent to the start of impregnation of the resinous paste material with the glass fibers, with the width of the thick molding compound maintained at a value substantially equal to that of the thick molding compound shortly after the start of the impregnation.

In contrast thereto, with the prior art paste supply tube assembly shown in FIG. 9, 2 hours after the start of the impregnation, it become necessary to clean the paste supply tubes due to clogging of the downstream ends of the paste supply tubes to such an extent as to exhibit a considerable reduction in width of the thick molding compound and hence as to cause the roll of the thick molding compound to represent a generally conical shape.

Figure 7:
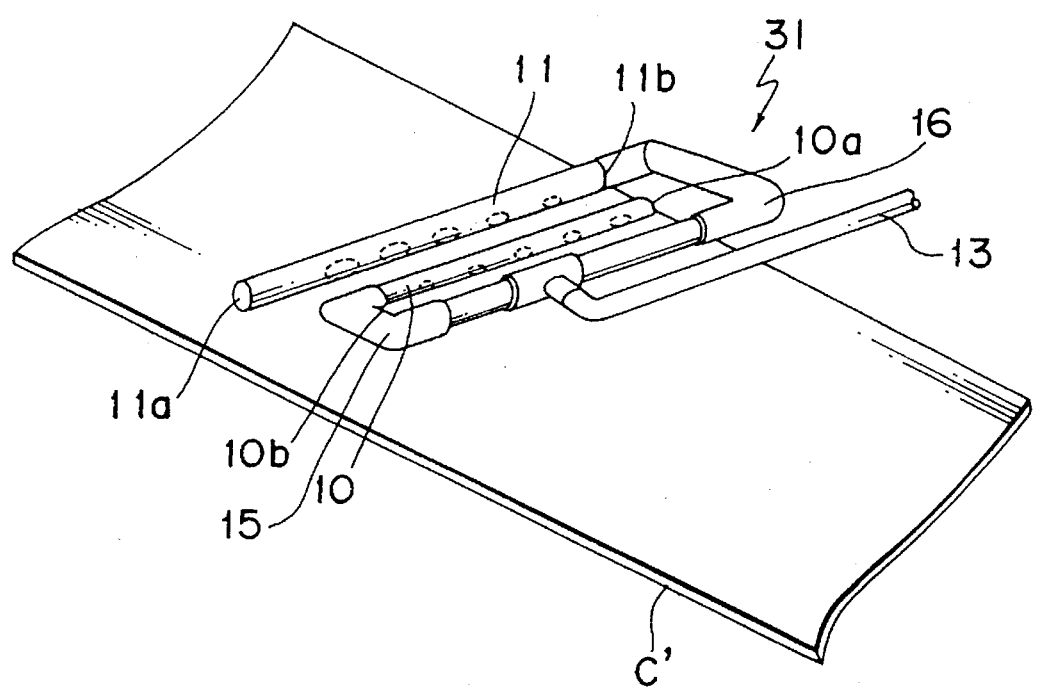
FIG. 7 is a schematic perspective view of a portion of the sheet molding compound manufacturing apparatus shown in FIG. 6, showing the paste supply tube assembly.
Figure 6:
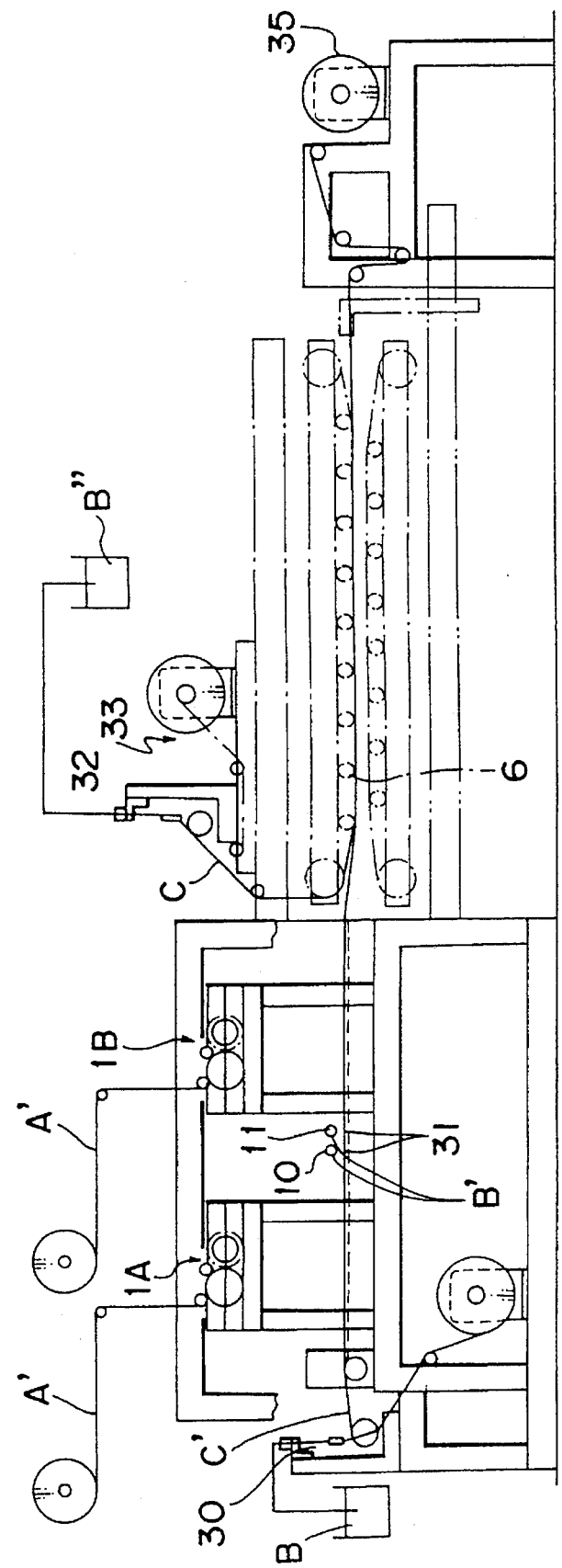
FIG. 6 is a schematic side view of the sheet molding compound manufacturing apparatus according to a second preferred embodiment of the present invention.

A second preferred embodiment of the present invention will now be described with reference to FIG. 6. The apparatus shown in FIGS. 6 to 8 is designed to continuously manufacture a multi-layered SMC of a structure in which, between the carrier films C and C', layers of resinous paste material and layers of glass fibers are sandwiched while alternating with each other. The resinous paste material in one layer may be of a composition either different from or identical with the resinous paste material in another layer. So far shown in FIG. 8, the multi-layered SMC is shown to have three layers of resinous paste material B, B' and B" alternating with two layers of the glass fibers A and A'. So far as shown in FIG. 8, the apparatus is so designed as to perform a process of supplying the resinous paste material B onto the lower carrier film C' at an upstream supply station so as to form a first resin layer, and then supplying the glass fibers A, cut by and supplied from a first roving cutter 1A, onto the lower carrier film C' so as to form a first fiber layer on the first resin layer. The process then comprises supplying the resinous paste material B' onto the lower carrier film C' at an intermediate supply station so as to form a second resin layer on the first fiber layer, supplying the glass fibers A', cut by and supplied from a second roving cutter 1B, onto the lower carrier film C' so as to form a second fiber layer on the second resin layer, supplying the resinous paste material B" onto the upper carrier film C at a downstream supply station so as to form a third resin layer on the second fiber layer, and finally laying the upper carrier film C over the layered structure on the lower carrier film C'.

Referring particularly to FIG. 6, the resinous paste material B supplied onto the lower carrier film C' at the upstream supply station is supplied in a predetermined constant thickness by means of a doctor blade 30 so as to paint the resinous paste material B on the lower carrier film C'.

The paste supply tube assembly designed according to the present invention is installed at the intermediate supply station defined on a downstream side of the glass roving cutter 1A with respect to the direction of transport of the carrier films C and C' and is operable to supply the resinous paste material B' to form the second resin layer over the first fiber layer carried by the lower carrier film C'.

As best shown in FIG. 7, the paste supply tube assembly employed in the second embodiment of the present invention is generally identified by 31 and is substantially identical with that shown in and described with particular reference to FIGS. 1 and 2, except that the paste supply tube assembly 31 of FIG. 7 is positioned above the lower carrier film C'. More specifically, even in this second embodiment, the downstream ends 10a and 11a of the first and second paste supply tubes 10 and 11 are held in position diagonally opposite to each other while the upstream ends 10b and 11b of the first and second paste supply tubes 10 and 11 are held in position diagonally opposed to each other such that the resinous paste material supplied into the first paste supply tube 10 flows towards the closed downstream end 10a in a direction counter to the direction of flow of the resinous paste material supplied into the second paste supply tube 11 so as to flow towards the closed downstream end 11a. Also, the aperture(s) means in each of the first and second paste supply tubes 10 and 11 employed in the second embodiment of the present invention has the effective opening progressively increasing from the upstream end 10b or 11b towards the closed downstream end 10a or 11a as is the case in the first embodiment of the present invention.

The second glass roving cutter 1B is positioned downstream of the paste supply tube assembly 31 with respect to the direction of transport of the carrier films C and C' and is operable to cut the glass rovings A' to provide glass fibers of a predetermined length which are subsequently supplied by gravity onto the lower carrier film C' so as to overlay the second resin layer.

Positioned downstream of the second glass roving cutter 1B with respect to the direction of transport of the carrier films C and C' is a doctor blade 32 and a film supply unit 33 for supplying a web of the upper carrier film C which is, after having been applied with the resinous paste material B' by the doctor blade 32, laid continuously over the layered resin structure on the lower carrier film C' to sandwich the latter in cooperation with the lower carrier film C'. The sandwich structure is then passed through a nipping region between the shaping rolls 6 to provide the resultant sheet compound which is then wound around the take-up roll 35.

Thus, in the second preferred embodiment of the present invention, the sheet molding compound manufacturing apparatus for the production of SMC is provided with the first and second paste supply tubes 10 and 11 supported above a lower one C' of the carrier films so as to extend parallel to each other and in a direction widthwise of the carrier films C and C', each of the first and second paste supply tubes 10 and 11 having upstream and downstream ends 10b and 10a, 11b and 11a opposite to each other with respect to the direction of supply of the resinous paste material thereinto. The downstream ends 10a and 11a of the respective first and second paste supply tubes 10 and 11 are closed, and the first and second paste supply tubes 10 and 11 are supported with the upstream and downstream ends 10b and 10a of the first paste supply tube 10 neighboring the downstream and upstream ends 11a and 11b of the second paste supply tube 11, respectively. Each of the first and second paste supply tubes 10 and 11 has an aperture(s) defined therein for discharge of the resinous paste material therethrough so that the resinous paste material can be uniformly dispensed in a direction widthwise of the carrier films C and C' onto the lower carrier film C'.

The second embodiment of the present invention will now be demonstrated by way of an example which is to be understood as presented only for the purpose of illustration, not for limiting the scope of the present invention.

EXPERIMENTAL EXAMPLE II

Using the apparatus shown in FIG. 6 and an apparatus similar to that shown in FIG. 6, but employing the prior art paste supply tube assembly of the structure shown in FIG. 9, comparative experiments have been carried out to determine the width of the resultant SMC and the shape of a roll of the resultant SMC wound around a take-up roll. It is to be noted that, in both apparatuses, the same doctor blades were employed as means for supplying the respective resinous paste materials B and B" at he upstream and downstream supply stations.

During the comparative experiments, for the resinous paste materials B and B" supplied from the doctor blade at the upstream supply station, the following composition was employed.

100 Parts of unsaturated polyester resin (Polymal 6409 manufactured by Takeda Chemical Industries, Ltd.)
3 parts of polyethylene powder (FLOTHENE UF 20 manufactured by Sumitomo Seika Kabushiki Kaisha)
1 part of tertiary-butyl peroxy benzoate (PERBUTYL Z manufactured by Nippon Yushi Kabushiki Kaisha)
0.05 part of hydroquinone (HQ manufactured by Fuji Shashin Film Kabushiki Kaisha)
4 parts of zinc stearate (SZ-2000 manufactured by Sakai Kagaku Kabushiki Kaisha)
5 parts of Ivory-colored toner (Product of Daitai Kakou Kabushiki Kaisha)
1 part of magnesium oxide (KYOWAMAG 40 manufactured by Kyowa Kagaku Kabushiki Kaisha)

For the resinous paste material B' supplied from the paste supply tube assembly at the intermediate supply station, the following composition was employed.

100 Parts of unsaturated polyester resin (Polymal 6409 manufactured by Takeda Chemical Industries, Ltd.)
3 parts of polyethylene powder (FLOTHENE UF 20 manufactured by Sumitomo Seika Kabushiki Kaisha)
1 part of tertiary-butyl peroxy benzoate (PERBUTYL Z manufactured by Nippon Yushi Kabushiki Kaisha)
0.05 part of hydroquinone (HQ manufactured by Fuji Shashin Film Kabushiki Kaisha)
4 parts of zinc stearate (SZ-2000 manufactured by Sakai Kagaku Kabushiki Kaisha)
120 parts of calcium carbonate (SUPER SS manufactured by Maruo Calcium Kabushiki Kaisha)
5 parts of Ivory-colored toner (Product of Daitai Kakou Kabushiki Kaisha)
1 part of magnesium oxide (KYOWAMAG 40 manufactured by Kyowa Kagaku Kabushiki Kaisha)

In both of the apparatus using the paste supply tube assembly of the present invention and the apparatus using the prior art paste supply tube assembly, the glass fibers prepared by cutting the glass rovings (TEX 4630 manufactured by Nippon Denki Garasu Kabushiki Kaisha) to 1 inch by the glass roving cutter were employed.

The resultant SMC contains 70 wt % of the resinous paste materials B, B' and B" of the above described compositions blended with 30 wt % of the glass fibers A and A'. The total amount of the resin paste material B and B" employed and the amount of the resin paste material B' were chosen to be 35 wt %, respectively.

Results of the experiments are tabulated in Table 2. As shown in Table 2, the use of the paste supply tube assembly 31 according to the present invention has resulted in a distribution of substantially uniform thickness over the widthwise direction of the sheet molding compound, for an 8 hour period subsequent to the start of impregnation of the resinous paste material with the glass fibers, with the width of the sheet molding compound maintained at a value substantially equal to that of the sheet molding compound shortly after the start of the impregnation.

In contrast thereto, with the prior art paste supply tube assembly shown in FIG. 9, 2 hours after the start of the impregnation, it become necessary to clean the paste supply tubes due to clogging of the downstream ends of the paste supply tubes to such an extent as to exhibit a considerable reduction in width of the sheet molding compound and hence as to cause the roll of the sheet molding compound to represent a generally conical shape.

TABLE 2

| Time Passed after Impregnation Starts | Embodiment | | Prior Art | |
|---|---|---|---|---|
| | Width W | Roll Shape | Width W | Roll Shape |
| Shortly | 1,000 mm | normal | 1,000 mm | normal |
| 1 hour | 1,000 mm | normal | 990 mm | somewhat conical |
| 2 hours | 1,000 mm | normal | 985 mm | unable to roll** |
| 8 hours | 1,000 mm | normal | * | unable to roll** |

*indicates that the cleaning of the paste supply tubes came to be required.
**indicates that the roll of the resultant SMC was too conical to take up around the take-up roll.

Thus, it has now become clear that, even though the resinous paste material piles up within and at the closed downstream end of, for example, the first paste supply tube and the viscosity thereof gradually increases to such an extent as to substantially close or completely close part of the aperture means in a generally downstream region of the first paste supply tube, reduction in quantity of the resinous paste material discharged from the downstream region of the first paste supply tube can be advantageously compensated for by the quantity of the resinous paste material discharged from part of the aperture(s) in a generally upstream region of the second paste supply tube. Accordingly, the resinous paste material can be efficiently supplied so as to be spread uniformly in a direction widthwise of the carrier films, thereby avoiding the possible reduction in width of the sheet molding compound which would otherwise occur with the passage of time.

Also, since the thickness of the resultant sheet molding compound can be maintained substantially uniform across the width thereof for a prolonged time, the sheet molding compound can be uniformly wound around the take-up reel or roll with no biased winding taking place.

In addition, the apparatus can be operated for a prolonged time, e.g., at least up to 8 hours, with no need to be interrupted for cleaning of the paste supply tube assembly. Specifically, while the prior art paste supply tube assembly requires a cleaning at intervals of 2 to 3 hours, the present invention does not require it during the working hours of a day and, therefore, the cleaning of the paste supply tube assembly may be carried out after the scheduled length of the sheet molding compound has been manufactured for each day. This contributes to a considerable improvement in productivity.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An apparatus for manufacturing fiber-reinforced molding compound, said apparatus comprising:

means for transporting first and second webs of carrier film in one direction past an adjoining region at which the first and second webs of carrier film meet;

first and second impregnating rolls rotatably mounted above the adjoining region for rotation in opposite directions with respect to each other about longitudinal axes, respectively, which are oriented substantially transverse to said one direction, said first and second impregnating rolls defining a mixing gap therebetween;

a chopping means for chopping rovings into reinforcement fibers and for distributing the reinforcement fibers into the mixing gap;

means for supplying resinous paste material into the mixing gap to allow the reinforcement fibers and the resinous paste material to mix together to provide a reinforced resinous mixture which subsequently falls downwardly past the mixing gap towards the adjoining region between the first and second webs of carrier film as said first and second impregnating rolls are rotated in the opposite directions with respect to each other;

means positioned adjacent the adjoining region for laminating the first and second webs of carrier film with the reinforced resinous mixture sandwiched therebetween; and wherein said supplying means comprises:

a first paste supply tube disposed above the first impregnating roll and having upstream and downstream ends opposite to each other, said downstream end of said first supply tube being closed, said first supply tube having a first aperture arrangement defined therein for discharge of the resinous paste material therethrough;

a second paste supply tube disposed above the second impregnating roll and having upstream and downstream ends opposite to each other, said second supply tube being disposed so as to extend parallel to and be spaced a predetermined distance from said first supply tube, said downstream end of said second supply tube being closed, said second supply tube having a second aperture arrangement defined therein for discharge of the resinous paste material therethrough;

a resinous paste material supply source for supplying the resinous paste material under pressure to said first and second supply tubes;

a tubular coupling fluid-connecting the upstream ends of said first and second supply tubes together and being fluid-connected with said resinous paste material source, said tubular coupling fixing said first and second supply tubes in position with the upstream and downstream ends of said first paste supply tube neighboring the downstream and upstream ends of said second paste supply tube, respectively, with respect to a direction perpendicular to a longitudinal axis of each of said first and second paste supply tubes;

wherein said first impregnating roll is positioned immediately below said first supply tube, and said second impregnating roll is positioned immediately below said second supply tube;

wherein said first aperture arrangement has an effective opening area that progressively increases from the upstream end towards the downstream end of said first paste supply tube; and wherein said second aperture arrangement has an effective opening area that progressively increases from the upstream end towards the downstream end of said second paste supply tube;

whereby, when the resinous paste material is supplied into said first and second supply tubes through the tubular coupling, part of the resinous paste material flows under pressure in said first supply tube in a first direction from the upstream end towards the downstream end of said first paste supply tube and part of the resinous paste material flows under pressure in said second supply tube in a second direction from the upstream end towards the downstream end of said second paste supply tube, said second direction being opposite to said first direction, the resinous paste material in said first supply tube being discharged through said first aperture arrangement onto said first impregnating roll, and the resinous paste material in said second supply tube being discharged through said second aperture arrangement onto said second impregnating roll.

2. An apparatus as claimed in claim 1, wherein said first aperture arrangement comprises a plurality of regularly spaced first holes defined in said first supply tube in at least one row extending lengthwise thereof, said first holes having sizes which progressively increase from the upstream end towards the downstream end of said first supply tube; and said second aperture arrangement comprises a plurality of regularly spaced second holes defined in said second supply tube in at least one row extending lengthwise thereof, said second holes having sizes which progressively increase from the upstream end towards the downstream end of said second supply tube.

3. An apparatus as claimed in claim 1, wherein said first aperture arrangement comprises a first slit extending lengthwise of said first paste supply tube, said first slit having a width that progressively increases from the upstream end towards the downstream end of said first supply tube; and said second aperture arrangement comprises a second slit extending lengthwise of said second paste supply tube, said second slit having a width that progressively increases from the upstream end towards the downstream end of said second supply tube.

4. An apparatus as claimed in claim 1, further comprising an endless conveyor for conveying said first and second webs of carrier film once the resinous paste material has been disposed therebetween and said first and second webs have moved downstream of said adjoining region; and wherein said first and second paste supply tubes are disposed above said endless conveyor, and said first and second aperture arrangements open downwardly in a direction perpendicular to said endless conveyor.

5. An apparatus for manufacturing fiber-reinforced molding compound said apparatus comprising:

means for transporting a first web of carrier film in one direction along a predetermined path;

means for transporting and laying a second web of carrier film so that the second web of carrier film overlays the first web of carrier film at an adjoining station;

a chopping means positioned above said predetermined path at a first position upstream of said adjoining station for chopping rovings into reinforcement fibers and for distributing the reinforcement fibers onto the first web of carrier film;

means disposed above said predetermined path at a second position upstream of said adjoining station for supplying resinous paste material onto the first web of carrier film to mix with the fibers and thereby provide a reinforced resinous mixture to be sandwiched between the first and second webs of carriers film; and wherein said supplying means comprises:

a first paste supply tube having upstream and downstream ends opposite to each other, said downstream end of said first supply tube being closed, said first supply tube having a first aperture arrangement defined therein for discharge of the resinous paste material therethrough;

a second paste supply tube having upstream and downstream ends opposite to each other, said second supply tube being disposed so as to extend parallel to and be spaced a predetermined distance from said first supply tube, said downstream end of said second supply tube being closed, said second supply tube having a second aperture arrangement defined therein for discharge of the resinous paste material therethrough; and a resinous paste material supply source for supplying the resinous paste material under pressure to said first and second supply tubes;

a tubular coupling fluid-connecting the upstream ends of said first and second supply tubes together and being fluid-connected with said resinous paste material source, said tubular coupling fixing said first and second supply tubes in position with the upstream and downstream ends of said first paste supply tube neighboring the downstream and upstream ends of said second paste supply tube, respectively, with respect to a direction perpendicular to a longitudinal axis of each of said first and second paste supply tubes;

wherein said first aperture arrangement has an effective opening area that progressively increases from the upstream end towards the downstream end of said first paste supply tube; and wherein said second aperture arrangement has an effective opening area that progressively increases from the upstream end towards the downstream end of said second paste supply tube;

whereby, when the resinous paste material is supplied into said first and second supply tubes through the tubular coupling, part of the resinous paste material flows under pressure in said first supply tube in a first direction from the upstream end towards the downstream end of said first paste supply tube and part of the resinous paste material flows under pressure in said second supply tube in a second direction from the upstream end towards the downstream end of said second paste supply tube, said second direction being opposite to said first direction, the resinous paste material in said first supply tube being discharged through said first aperture arrangement onto the first web of carrier film, and the resinous paste material in said second supply tube being discharged through said second aperture arrangement onto the first web of carrier film.

6. An apparatus as claimed in claim 5, wherein said first aperture arrangement comprises a plurality of regularly spaced first holes defined in said first supply tube in at least one row extending lengthwise thereof, said first holes having sizes which progressively increase from the upstream end towards the downstream end of said first supply tube; and said second aperture arrangement comprises a plurality of regularly spaced second holes defined in said second supply tube in at least one row extending lengthwise thereof, said second holes having sizes which progressively increase from the upstream end towards the downstream end of said second supply tube.

7. An apparatus as claimed in claim 5, wherein said first aperture arrangement comprises a first slit extending lengthwise of said first paste supply tube, said first slit having a width that progressively increases from the upstream end towards the downstream end of said first supply tube; and said second aperture arrangement comprises a second slit extending lengthwise of said second paste supply tube, said second slit having a width that progressively increases from the upstream end towards the downstream end of said second supply tube.

8. An apparatus as claimed in claim 5, wherein said first and second aperture arrangements open downwardly in a direction perpendicular to said predetermined path along which said first web of carrier film is transported.

\* \* \* \* \*